(12) United States Patent
Brailsford

(10) Patent No.: US 8,361,947 B2
(45) Date of Patent: Jan. 29, 2013

(54) PAINT REMOVER

(75) Inventors: Michael Brailsford, Chilton Nr Aylesbury (GB); Simon Mark Dormon, legal representative, London (GB); Sara Jayne Brailsford, legal representative, London (GB); Michele Ann Brailsford, legal representative, Kent (GB)

(73) Assignee: Peel Away Limited (GB)

( * ) Notice: Subject to any disclaimer, the term of this patent is extended or adjusted under 35 U.S.C. 154(b) by 0 days.

(21) Appl. No.: 12/598,172

(22) PCT Filed: Apr. 30, 2008

(86) PCT No.: PCT/IB2008/001412
§ 371 (c)(1),
(2), (4) Date: Aug. 30, 2010

(87) PCT Pub. No.: WO2008/142562
PCT Pub. Date: Nov. 27, 2008

(65) Prior Publication Data
US 2010/0326479 A1 Dec. 30, 2010

(30) Foreign Application Priority Data
Apr. 30, 2007 (AU) .................................. 2007902248

(51) Int. Cl.
*C11D 7/50* (2006.01)
(52) U.S. Cl. ........ 510/201; 510/202; 510/206; 510/212; 134/38
(58) Field of Classification Search .................. 510/201, 510/202, 206, 212; 134/38
See application file for complete search history.

(56) References Cited

U.S. PATENT DOCUMENTS

| | | | |
|---|---|---|---|
| 4,426,250 A | 1/1984 | Brailsford | |
| 4,579,627 A * | 4/1986 | Brailsford | 134/38 |
| 5,011,621 A * | 4/1991 | Sullivan | 510/211 |
| 5,188,675 A | 2/1993 | Dormon-Brailsford | |
| 5,461,094 A | 10/1995 | Yoo et al. | |
| 5,518,661 A * | 5/1996 | Langford et al. | 252/364 |
| 5,597,788 A | 1/1997 | Stevens | |
| 5,696,072 A * | 12/1997 | Nercissiantz et al. | 510/206 |
| 5,726,140 A * | 3/1998 | Distaso | 510/207 |
| 5,744,438 A | 4/1998 | Distaso | |
| 5,780,409 A * | 7/1998 | Distaso | 510/207 |
| 6,239,090 B1 * | 5/2001 | Marquis et al. | 510/201 |
| 6,369,009 B1 * | 4/2002 | Machac et al. | 510/201 |
| 6,465,405 B1 | 10/2002 | Vitomir | |
| 6,479,445 B1 * | 11/2002 | Machac et al. | 510/206 |
| 6,548,464 B1 * | 4/2003 | Machac et al. | 510/202 |
| 6,586,380 B2 * | 7/2003 | Marquis et al. | 510/201 |
| 6,833,341 B2 * | 12/2004 | Machac et al. | 510/202 |
| 2002/0142928 A1 * | 10/2002 | MacHac et al. | 510/201 |
| 2003/0119686 A1 * | 6/2003 | Machac et al. | 510/201 |
| 2006/0234890 A1 * | 10/2006 | Griese et al. | 510/214 |
| 2007/0241306 A1 * | 10/2007 | Wehner et al. | 252/67 |
| 2009/0093390 A1 * | 4/2009 | Gross et al. | 510/174 |
| 2010/0233146 A1 * | 9/2010 | McDaniel | 424/94.2 |
| 2010/0326479 A1 * | 12/2010 | Brailsford et al. | 134/115 R |

FOREIGN PATENT DOCUMENTS
GB 2337759 A 12/1999
* cited by examiner

*Primary Examiner* — Gregory Webb
(74) *Attorney, Agent, or Firm* — Brooks Kushman P.C.

(57) ABSTRACT

A paint removal system is disclosed which comprises an environmentally safe paint stripping composition of which the primary constituent is benzyl alcohol, and which is applied to a substrate of one or more layers of paint to be removed from a surface. An impermeable biodegradable membrane is used in conjunction therewith, whereby the membrane is applied as a cover over the applied paint stripper to assist in the penetration of the paint stripping compound into the layers of paint and to assist in subsequent removal of the released paint and used stripper.

33 Claims, No Drawings

PAINT REMOVER

TECHNICAL FIELD

The present invention relates to a paint removal system that has the ability to remove one or more coats of paint and or varnish with one application. In particular it relates to the application of a paint stripping compound used in conjunction with a membrane placed over the applied paint stripper to enhance the penetration of the stripper into the layers of paint and assist in the ready removal of treated layers once the stripper has penetrated the layers.

The invention particularly relates to a biodegradable and ecologically compatible paint removal system.

BACKGROUND OF THE INVENTION

It is well known in the art to chemically remove or otherwise strip cured coatings of paint, varnish or the like by treating the coated surface with a composition that includes volatile chlorinated hydrocarbons, such as methylene chloride, or N-methyl-2-pyrrolidone, a nitrogen heterocyclic compound. However, the use of such products presents problems for the environment and such formulations are based on suspected carcinogens.

Furthermore, paint removal systems have been developed which are designed to remove multiple layers of paint in only one application for easy removal and control of stripped paint thus preventing particles of lead and other toxic compounds from polluting the atmosphere. Essentially these rely on the application of a membrane over the applied patent stripper to assist in the penetration of the paint stripper into the several layers of paint and subsequent removal thereof by the virtue of the treated paint layers adhering to the membrane for easy removal.

For example, U.S. Pat. No. 4,579,627 to Michael I Brailsford, the applicant for the present invention, describes the use of a needle punched polypropylene as such a membrane. However that material was not impermeable and was found to be less effective than materials now put forward in this specification.

A second patent, in the name of the same inventor, GB. 2,337,759 describes a low-density polyethylene laminated to a paper tissue, in which the polyethylene was impermeable but not biodegradable. This material however provided improvements in allowing the stripper to penetrate the layers of paint more effectively but suffered in being difficult to dispose of.

Whilst these systems were relatively effective in removing layers of paint in one application, they were not ecologically compatible in that they did not provide a degradable or biodegradable membrane, nor were the paint stripping formulae themselves safe for the environment. Therefore, although removal of the paint from the substrate was effective, subsequent disposal of the membrane/removed paint/used stripper was problematic.

OBJECT OF THE INVENTION

Therefore, having regard to the forgoing background, it is a primary object of the present invention to provide a biodegradable chemical paint removal system, which can be economically produced and safely and effectively used on a variety of coatings, while minimising the effects of the chemical paint removal process on the user and on the surrounding environment when the waste material is subsequently disposed.

It is therefore an objective of the present invention to provide an environmentally and ecologically safer chemical paint removal system which includes an alternative paint stripper to the present chemical formulae that are currently available such as those based on methylene chloride or N-methyl-2-pyrrolidone.

It is a further object of the invention to also provide a degradable or biodegradable membrane, for use with the proposed alternate paint stripping compound, for example a biodegradable polyethylene impermeable cover, which not only keeps the active ingredients penetrating multilayers of paint, but which also acts as a "pick up" or collection vehicle for the stripped paint and remover. The cover or membrane so described may be printed with instructions, illustrations and/or a notice to indicate that chemical paint removal is taking place.

Thus, it is yet another object of the present invention to minimise the evaporation of the solvent used by incorporating it into an inert composition and applying a degradable or biodegradable polyethylene cover that is impermeable to evaporation for the duration of the time necessary for the solvent to break the bond of the cured paint to the surface.

It is yet another object of the present invention to provide an impermeable cover that is degradable or biodegradable and therefore compostable when placed into a landfill. The biodegradable chemistry within the polyethylene cover is a process of decomposition that is started with exposure to ultra violet light (sunlight or microbial activity).

At the very least, the present invention provides an alternative paint removal system to those which are presently available.

DISCLOSURE OF THE INVENTION

According to a first aspect of the present invention there is provided paint removal system comprising an environmentally safe paint stripping composition of which the primary constituent is benzyl alcohol, and which is applied to a substrate of one or more layers of paint to be removed from a surface and an impermeable biodegradable membrane for use in conjunction therewith, whereby the membrane is applied as a cover over the applied paint stripper to assist in the penetration of the paint stripping compound into the layers of paint and to assist in subsequent removal of the released paint and used stripper.

The primary constituent of the present invention is thus benzyl alcohol, which is an aromatic alcohol, and which when mixed with water, clay, surfactant, and thickening agents is made into a non-sagging paste. This paste is applied to a painted surface at a thickness approximately equal to that of the paint to be removed and left for up to 24 or 48 hours or even longer depending on the ambient temperature and thickness of the paint to be removed, after which time the biodegradable cover paste and paint will have normally coalesced and can be removed as one piece with the cover.

By mixing the active ingredients into a thick paste an even thickness can be more easily applied to the surface, ensuring an even removal of the coatings.

According to a further aspect of the invention, a preferred formulation includes benzyl alcohol, water, hydroxypropyl methylcellulose, sodium carboxymethylcellulose, sodium dioctyl sulfosuccinate and clay or chalk.

The compound is formed into a paste in the following way: The benzyl alcohol is first mixed with the hydroxypropyl methylcellulose to form a gel. The water is then premixed with sodium carboxymethylcellulose and then added to the previously thickened benzyl alcohol. Alternatively, the water may be added directly to the benzyl alcohol, or vice versa, after which the thickening agent is added to form a viscous gel. The surfactant, namely sodium dioctyl sulfosuccinate, is then added.

After this, the clay and/or chalk is slowly added until a thick homogenous non-dropping paste is achieved.

The principle ingredient benzyl alcohol [empirical formula $C_7H_8O$] has been found to be 100% biodegradable after 14 days once exposed to the environment. The stripping paste is pH neutral and within the present formula has zero voc (volatile organic compounds).

In the preferred formulation, the amount of benzyl alcohol can be between 10% and 90%, the preferred amount being 20%. The preferred thickening agent for the benzyl alcohol is Methocel 311 by Dow Chemicals at between 1% & 10%, the preferred amount being 2%. The water content can be between 5% & 65%, the preferred amount being 30%. The preferred water-thickening agent is carboxymethylcellulose by Hercules at between 1% and 10%; the preferred amount being 2%. The surfactant, sodium dioctyl sulfosuccinate is utilised at between 1% & 5%, the preferred amount being 2%. Aluminium silicate and/or chalk is added at between 30% & 80%, the preferred amount being 40%. Wheat starch which helps absorb any free liquid within the silicate particles is optionally added at between 3% and 30%, the preferred amount being between 10% and 15% depending on the particle size of the clay and chalk.

Alternatively the paint removal formulation is preferably contains benzyl alcohol at between 5% and 85%, tap water at between 10% and 90%, hydroxypropyl methylcellulose [as Methocel 311 from Dow Chemical], at between 1% and 15%, silicates of aluminium/magnesium in the form of activated clay at between 20% and 75%, with the optional addition of wheat starch at between 3% and 30%.

A particularly preferred chemical formula for this invention is:

|  | % | cumulative % |
| --- | --- | --- |
| benzyl alcohol | 20 |  |
| water | 30 | 50 |
| hydroxypropyl methylcellulose | 2 | 52 |
| carboxymethylcellulose | 2 | 54 |
| surfactant | 2 | 56 |
| activated clay | 40 | 96 |
| wheat starch | 4 | 100. |

The mixing is preferably performed within a ribbon blender as follows: Methylcellulose is added to the benzyl alcohol and mixed for 30 minutes, the carboxymethylcellulose is mixed separately with the water for 15 minutes and then added to the thickened benzyl alcohol, mixing for a further 15 minutes, after which the activated clay and wheat starch is added and left to mix for one hour until a thick creamy non-dropping paste is formed.

In a further embodiment of the invention, it has been found useful to provide a formulation based on the foregoing but with added sodium hydroxide or calcium hydroxide or other chemical to increase the pH. The purpose in this formulation is to bind the lead particles in any lead-containing paint removed by converting them to lead hydroxide which in the damp state, prevents the lead from leeching into landfills etc.

The preferred cover included in the present invention; is manufactured from biodegradable printable high-density polyethylene treated with propriety chemicals to ensure it becomes biodegradable once exposed to the environment.

The paste described has been found to decompose or otherwise break the surface bond of most domestic, architectural and industrial coatings from most surfaces, including wood, plaster, brick, concrete and metal, and has been most effective in removing antifouling and other coating from fibre glass without damage to the matrix. The compound has also proved beneficial in removing paint from wood or metal window frames since the stripping formula will not etch or otherwise damage glass. It has been found that surfaces stripped with the formulae within the invention can be simply washed with water or denatured alcohol prior to refinishing.

The paste of the present invention can be applied with a spatula, or where larger areas are concerned, with a trowel used for plastering. It can also be sprayed with an appropriate sprayer.

According to another aspect of the invention there is provided a paint removal composition as hereinbefore described that is mixed into a thick paste with the aid of the methylcellulose and wheat flour and applied to a surface at a thickness of up to 4 mm to a surface previously paint with multi-coats of different paints and left for up to 72 hours before removal.

The aforementioned paint stripping composition is covered with a degradable impermeable polyethylene to prevent evaporation of the active ingredients while they penetrate the various layers of paint.

Preferably the coating removal composition comprises constituents which are all degradable over a 14-day period. Preferably the paint stripping composition comprises various constituents are non-hazardous and does not produce toxic fumes, more preferably one that is water based.

Preferably, the polyethylene membrane cover is degradable over a 15-month period according to the type of exposure to the elements.

EXAMPLES

1. Exterior concrete floor of a balcony approximately 30 years old, the paint to be removed was a thick green two-part epoxy acrylic. A small section about 250 mm square was chosen as a test patch, and the aforementioned stripper composition was applied about 3 mm thick with a plasterer's float, and covered with the degradable plastic membrane, and left for 36 hours during which time the temperature ranged from 2 degrees Fahrenheit to 78 degrees Fahrenheit and it had rained. After the 36-hour period the patch was removed complete with paint, stripper and cover, revealing the original concrete floor, water was used to clean up.
2. 1970 interior plaster ceiling covered with a cream distemper undercoat and a thick acrylic asbestos paint, the stripper paste was applied about 3 mm thick over a 250 mm square patch covered with the plastic membrane that is mentioned in this patent application and left for 24 hours, after which time the patch was removed leaving a slight residue that was easily removed with a damp sponge.
3. Painted exterior stone lintel arid brickwork circa 1890, the stripping paste was applied over a 250 mm square patch at 3 mm then covered with the plastic membrane and left for 48 hours. On removal it was found that three coats of exterior acrylic and four coats of oil-based paint had been removed exposing the original colour of the stone and brick any residue was removed easily with water.
4. interior metal door circa 1930 with up to 8 coats of old oil based lead paint. The stripping paste was applied over a 250 mm square area, covered with the degradable membrane and left for 24 hours, after which time the patch was removed revealing the original metal surface.

5. The stripping paste described in the patent application was applied to the fibreglass hull of a 1955 20 m yacht to remove the anti-fouling paint and covered with the described plastic cover. After 7 hours the paint, paste and cover was removed down to the gel coat. Any residue was easily washed down with water.

6. A thin coating of the stripping paste was applied to a small heavily varnished bookcase and left for 1 hour, after which time a metal scraper was used to remove the majority of the old varnish leaving a residue which could be easily removed with a green scouring pad dipped into a bowl of water, and sponged dry.

As an alternative to the foregoing use of Methocel 311, it has been found that substituting an alternative thickening agent manufactured by the Hercules Company, namely Klucel PR, a hydroxypropylcellulose, at between 1% and 8%, preferably 5%, to the combination of benzyl alcohol and water hereinbefore disclosed, results in the production of a thixotropic paint like compound for the removal of varnish or thinner coats of paint, with or without the addition of clay, chalk or the aforementioned preferred ingredients.

In another embodiment of the invention of the above formula, the addition of Q cells glass spheres produced by the PQ Corporation adds to the fluidity of the paste, at between 5% and 20%, preferably 6%.

Thus an alternate preferred chemical formula for this invention is:

|  | % | cumulative % |
| --- | --- | --- |
| benzyl alcohol | 20 |  |
| water | 20 | 40 |
| Klucel hydroxypropylcellulose | 5 | 45 |
| surfactant | 2 | 47 |
| Q Cell micro spheres | 6 | 53 |
| activated clay | 40 | 93 |
| wheat starch | 7 | 100. |

It will be appreciated by those skilled in the art that many modifications and variations may be made to the embodiments described herein without departing from the spirit or scope of the invention.

Throughout the specification the word "comprise" and its derivatives are intended to have an inclusive rather than exclusive meaning unless the context requires otherwise.

The invention claimed is:

1. A paint removal system comprising an environmentally safe paint stripping composition of which the primary constituent is benzyl alcohol, and which is applied to a substrate of one or more layers of paint to be removed from a surface and an impermeable biodegradable membrane for use in conjunction therewith, whereby the membrane is applied as a cover over the applied paint stripper to assist in the penetration of the paint stripping compound into the layers of paint and to assist in subsequent removal of the released paint and used stripper, in which the cover for removing the treated paint includes an impermeable, biodegradable, printable high-density polyethylene.

2. A paint removal system according to claim 1, in which the paint stripping composition in addition to benzyl alcohol, includes water, clay, surfactant, and thickening agent.

3. A paint removal system according to claim 2, in which the paint stripping composition includes benzyl alcohol, water, hydroxypropyl methylcellulose, sodium carboxymethylcellulose, sodium dioctyl sulfosuccinate and clay or chalk.

4. A paint removal system according to claim 2 in which the pH of the paint stripping composition is increased by the addition of sodium hydroxide, calcium hydroxide or other chemical up to a pH of 13.

5. A paint removal system according to claim 3, in which the paint stripping composition is made into a non-sagging paste.

6. A paint removal system according to claim 3, in which the paint stripping composition has an amount of benzyl alcohol between 10% and 90%.

7. A paint removal system according to claim 3, in which the hydroxypropyl methylcellulose which is used as a thickening agent for the benzyl alcohol is present in an amount between 1% & 10% of the total composition.

8. A paint removal system according to claim 3, in which the water content of the paint stripping composition is between 5% & 65%.

9. A paint removal system according to claims 8, in which the water content of the paint stripping composition is approximately 30% to 40%.

10. A paint removal system according to claim 3, in which the carboxymethylcellulose which is used as a water thickening agent, is used at between 1% and 10% of the total composition.

11. A paint removal system according to claim 3, in which the surfactant, sodium dioctyl sulfosuccinate is utilized at between 1% & 5% of the total composition.

12. A paint removal system according to claim 3, in which aluminium silicate and/or chalk is added to the composition at between 30% & 80%.

13. A paint removal system according to claim 6, in which the paint stripping formulation has an amount of benzyl alcohol equal to 20%, hydroxypropyl methylcellulose equal to 2%, carboxymethylcellulose equal to 2%, sodium dioctyl sulfosuccinate equal to 2%, and aluminium silicate and/or chalk equal to 40%, the balance being water.

14. A paint removal system according to claim 3, in which wheat starch is added to the composition at between 3% and 30%, to help absorb any free liquid within the silicate particles.

15. A paint removal system according to claim 14, in which wheat starch is added to the composition at between 10% and 15%.

16. A paint removal system according to claim 3, in which the paint removal composition contains benzyl alcohol at between 5% and 85%, tap water at between 10% and 90%, hydroxypropyl methylcellulose at between 1% and 15%, silicates of aluminium/magnesium in the form of activated clay at between 20% and 75%.

17. A paint removal system according to claims 16, in which the paint removal composition has the addition of wheat starch at between 3% and 30%.

18. A paint removal system according to claim 3, in which the formulation of the paint stripping composition is as follows:

|  | % | cumulative % |
| --- | --- | --- |
| benzyl alcohol | 20 |  |
| water | 30 | 50 |
| hydroxypropyl methylcellulose | 2 | 52 |
| carboxymethylcellulose | 2 | 54 |
| surfactant | 2 | 56 |
| activated clay | 40 | 96 |
| wheat starch | 4 | 100. |

19. A paint removal system according to claim 1, in which the paint stripping composition is in the form of a paste capable of application with a spatula, with a trowel used for plastering, or with a sprayer.

20. A paint removal system according to claim 1, in which there is provided a paint stripping composition capable of being mixed into a thick paste including a wheat flour thickening agent, the paste capable of being applied to a surface at a thickness of up to 4 mm, the surface having multi-coats of different paints, and the paste being left for up to 72 hours before removal.

21. A paint removal system according to claim 20, wherein the degradable impermeable membrane is capable of preventing evaporation of the benzyl alcohol while the alcohol penetrates the various layers of paint.

22. A paint removal system according to claim 1, wherein the coating removal composition comprises constituents which are all degradable over a 14-day period.

23. A paint removal system according to claim 1, wherein the paint stripping composition is water based and comprises various constituents which are non-hazardous and does not produce toxic fumes.

24. A paint removal system according to claim 1, wherein the membrane cover is a polyethylene material and is degradable over a 15-month period when exposed to the elements.

25. A paint removal system according to claim 3, in which the thickening agent is a hydroxypropylcellulose, which is present in an amount ranging between 1% and 8%.

26. A paint removal system according to claim 25, in which the hydroxypropylcellulose is used at 5%.

27. A paint removal system according to claim 25, in which the hydroxypropylcellulose is added to the combination of benzyl alcohol and water forming a thixotropic paint compound capable of removing varnish or thinner coats of paint.

28. A paint removal system according to claim 3, further comprising glass spheres at between 5% and 20%.

29. A paint removal system according to claim 28, wherein the glass spheres are added at 6% of the composition.

30. A paint removal system according to claim 29, in which the thickening agent includes a hydroxypropylcellulose, present in amounts between 1% and 8%, wherein the formula for the paint stripping composition is:

|  | % | cumulative % |
|---|---|---|
| benzyl alcohol | 20 |  |
| water | 20 | 40 |
| hydroxypropylcellulose | 5 | 45 |
| surfactant | 2 | 47 |
| micro spheres | 6 | 53 |
| activated clay | 40 | 93 |
| wheat starch | 7 | 100. |

31. A paint removal system for use on a painted surface, the system comprising:
a paint stripping composition, including a water-miscible, biodegradable alcohol and water; and
an impermeable, biodegradable membrane adapted to contact the composition, retaining the alcohol when the composition covers the surface, in which the membrane includes an impermeable, biodegradable, printable high-density polyethylene.

32. The system according to claim 31, wherein the system is adapted to biodegrade during a time period ranging from 14 days to 15 months.

33. A paint removal system for use on a painted surface, the system comprising:
a paint stripping composition including benzyl alcohol in an amount ranging from 10 wt. % to 90 wt.% of the composition; and
an impermeable membrane adapted to contact the composition, retaining the alcohol when the composition covers the surface ,the membrane including an impermeable, biodegradable, printable high-density polyethylene membrane, wherein the composition has a pH ranging equal to or greater than 7.

* * * * *